United States Patent [19]

Wada

[11] Patent Number: 5,262,818
[45] Date of Patent: Nov. 16, 1993

[54] PROGRAM ZOOM CAMERA

[75] Inventor: Shigeru Wada, Azuchi, Japan

[73] Assignee: Minolta Camera Kabushiki Kaisha, Osaka, Japan

[21] Appl. No.: 542,079

[22] Filed: Jun. 22, 1990

[30] Foreign Application Priority Data

Jun. 23, 1989 [JP] Japan ................... 1-161673

[51] Int. Cl.⁵ .................... G03B 5/00; G03B 17/00
[52] U.S. Cl. .................... 354/400; 354/106; 354/145.1
[58] Field of Search .............. 354/400–407, 354/195.1, 105, 106

[56] References Cited

U.S. PATENT DOCUMENTS

| | | | |
|---|---|---|---|
| 4,002,405 | 1/1977 | Stahl | 354/195.1 X |
| 4,639,111 | 1/1987 | Harvey | 354/195.1 |
| 4,780,735 | 10/1988 | Taniguchi et al. | 354/105 |
| 4,860,045 | 8/1989 | Hamada et al. | 354/402 |
| 4,942,417 | 7/1990 | Miyazawa et al. | 354/400 |
| 4,951,075 | 8/1990 | Tokumaru et al. | 354/400 |
| 4,963,907 | 10/1990 | Inoue | 354/106 X |
| 4,972,221 | 11/1990 | Ohauki et al. | 354/402 |
| 5,010,358 | 4/1991 | Miyamoto | 354/402 |
| 5,097,279 | 3/1992 | Sakamoto et al. | 354/106 |
| 5,103,251 | 4/1992 | Kudo | 354/195.1 |
| 5,119,122 | 6/1992 | Kudo et al. | 354/400 |

FOREIGN PATENT DOCUMENTS

| | | |
|---|---|---|
| 54-26721 | 1/1979 | Japan . |
| 63-220118 | 9/1988 | Japan . |
| 63-298231 | 12/1988 | Japan . |
| 64-44428 | 1/1989 | Japan . |
| 1-107240 | 4/1989 | Japan . |

Primary Examiner—W. B. Perkey
Attorney, Agent, or Firm—Burns, Doane, Swecker & Mathis

[57] ABSTRACT

A program zoom camera enables photographing an object with a designated magnification even when the object is a moving object. In the camera, the expected object distance is predicted based on measured object distances during a release time lag, and a pseudo focal length photographing based on the data of expected object distance is executed. Accordingly, the range to be printed of a film is changed so that the object magnification becomes the designated magnification. In place of pseudo focal length photographing, the object after the time lag may be exposed on a film with the designated magnification by changing the focal length based on the data of expected object distance.

14 Claims, 7 Drawing Sheets

Fig. 8(a)
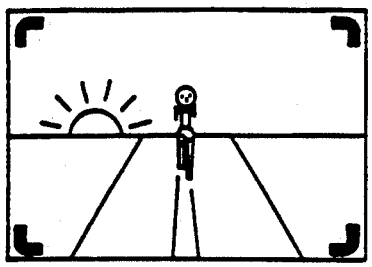
Fig. 8(b)
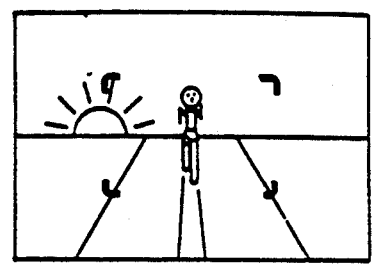
Fig. 8(d)
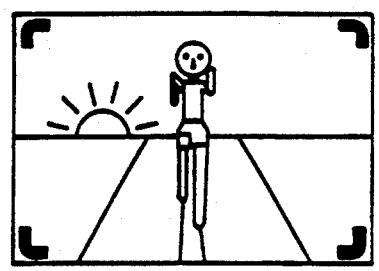
Fig. 8(c)
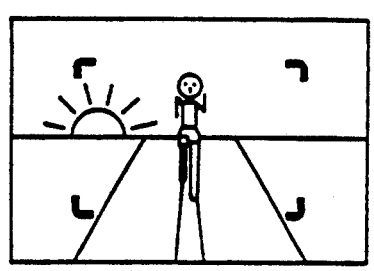
Fig. 9(a)
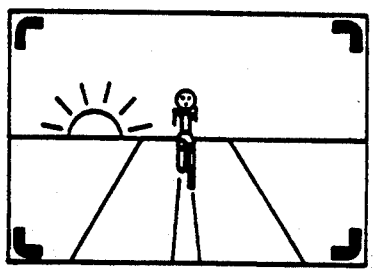
Fig. 9(b)
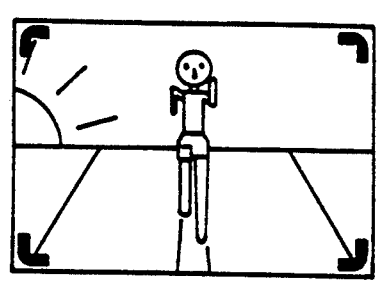
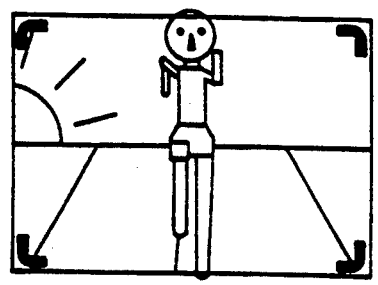
Fig. 9(c)

PROGRAM ZOOM CAMERA

BACKGROUND OF THE INVENTION

The present invention relates to a program zoom camera in which photographing range is changed corresponding to a distance of an object so that the object is printed in predetermined size.

It is conventionally known that a various of cameras in which photographing range can be set optionally. There are two ways to change the photographing range; one way is to change the focal length of a photographing lens, and the other way is to execute photographing without changing the focal length of the photographing lens, and at the same time, designate the range to be printed of a film and print only the designated range in printing. The latter way is called pseudo format camera or trimming camera and is described precisely in Japanese Laid-Open Patent Publication No. 54-26721.

Since the focal length of the photographing lens is not changed in the latter way, the range of a film to be exposed (so called photographing range) cannot be changed. Changed, though pseudo focal length is designated. It is noted that "photographing range" described in this specification indicates the range of which a photographer intends to photograph or the range revealed on a print. It does not always corresponding to the range exposed on a film. In those circumstances, in this specification, "change of photographing range" includes not only changing an exposure range but also changing the range to be printed, and further, the combination of the two ranges.

In such a camera where photographing range can be changed, it has been proposed that the size of the object be constantly printed in predetermined size by measuring distance from the camera to the object to be photographed and setting the photographing range according to the data of measured distance (for example, Japanese Laid-Open Patent Publication Nos. 1-44428 and 63-298231). This type of camera will be called a program zoom camera, and the change of photographing range according to the data of distance measuring will be called program zooming operation in this specification.

In a program zoom camera disclosed in Japanese Laid-Open Patent Publication No. 63-298231, it is designed that a range size to be printed which is designated in the pseudo focal length photographing (hereinafter referred to as trimming magnification), to is calculated automatically according to the data of object distance by selecting the predetermined print image.

Conventionally, when a moving object (object which is approaching or retreating from the camera) is photographed by using a program zoom camera, the size of the object image on a film is changed when a practical photographing is executed because of release time lag or the like. As a result, the size of the object to the photographing range differs from the predetermined size, especially when an object moving toward the camera is photographed under these conditions the the object often deviates from the scene to be photographed.

SUMMARY OF THE INVENTION

The present invention is directed to solve the above-mentioned problem. An object of the present invention is to provide a program zoom camera in which the size of the object to the photographing range can be constantly fixed even when a moving object is photographed.

In order to achieve this object, the present invention comprises distance measuring means for measuring distance from a camera to an object to be photographed, means for changing photographing range in order to maintain the predetermined size of an object to photographing range, judging means for judging whether the object is a moving object or not, and expecting means for expecting the distance from the camera to the object to be photographed after release time lag when the object is judged to be a moving object. The photographing range changing means changes the photographing range based on data of the expected object distance. The photographing range changing means may change the photographing range by changing range to be printed of a film.

According to the structure of the present invention, when an object is approaching or retreating from a camera, the object is automatically recognized as a moving object at the time of measuring the distance of the object. The object distance after release time lag is predicated, and then the photographing range is changed. Further, the change of the photographing range based on the data of distance measuring is executed by designating the range to be printed of a film.

BRIEF DESCRIPTION OF THE DRAWINGS

FIGS. 8(a), (b), (c) and (d) are views showing the visual field frame of a finder when the object which is approaching toward the camera is photographed with program zooming operation by using a program zoom camera of the present invention; and FIGS. 9(a), (b) and (c) are views showing the visual field frame when the object which is approaching toward the camera is photographed with pseudo focal length photographing by using a conventional automatic trimming camera.

DETAILED DESCRIPTION OF THE PREFERRED EMBODIMENTS

An embodiment of the present invention will be now described in the following with reference to the appended drawings.

Figure 1:
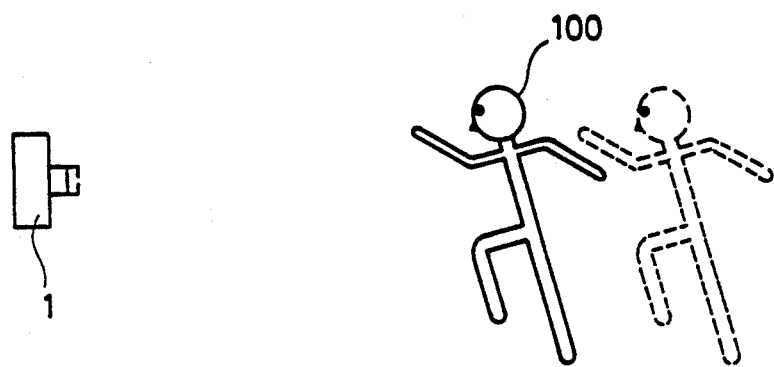
FIG. 1 is a side view showing a program zoom camera and an object which is approaching the camera.

FIG. 1 shows a program zoom camera 1 according to the present invention and an object 100 which is approaching the camera.

According to the embodiment of the present invention, change of the photographing range based on the data of distance measuring is executed by designating or directing the range to be printed of a film. Hence the program zoom camera according to the present invention enables a pseudo focal length photographing or pseudo telephoto and pseudo panoramic print, and can be called an automatic trimming camera. The ratio of the designated range to be printed to the usual range to be printed (whole range of film frame) will be called trimming magnification (electronic zoom magnification) hereinafter. For example, when the range to be printed is designated as quarter to the usual range to be printed, the trimming magnification will double.

The automatic trimming camera according to the present invention comprises a photographing optical system, a real image type finder system, a zoom electronic flash system, and a control device for controlling each system and calculating trimming magnification.

Each structure will be described with reference to FIGS. 2 to 7.

Figure 2:
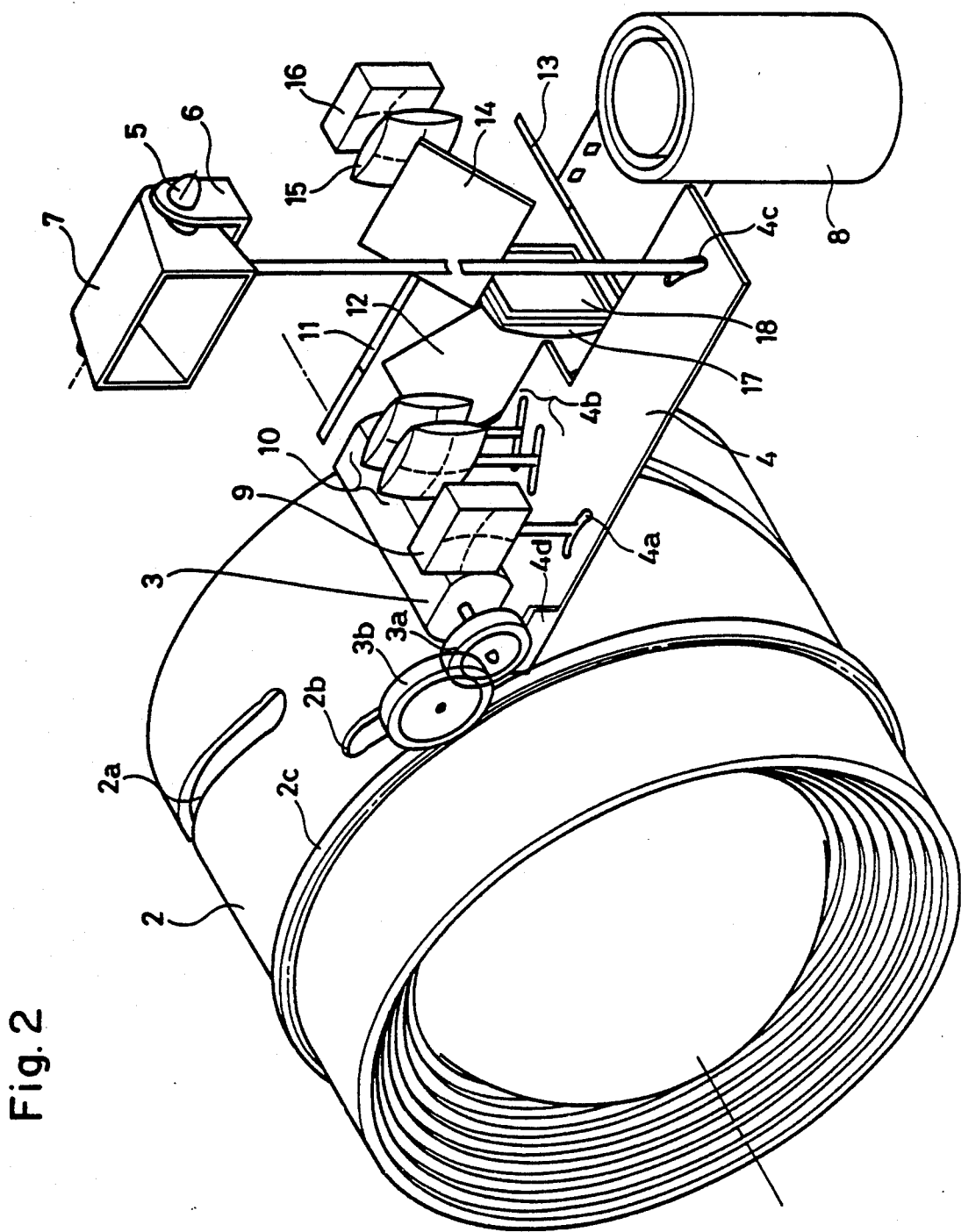
FIG. 2 is a perspective view showing an optical system lens of an automatic trimming camera and the structure of zoom thereof according to an embodiment of the present invention.

FIG. 2 shows the photographing optical system, the real image type finder system and the zoom electronic flash system of the automatic trimming camera 1 in the embodiment of the present invention.

The photographing optical system comprises a group of lenses of the optical system and a lens mount 2 containing the group of lenses the lens mount 2 provides a focusing mechanism for executing focus operation and a zooming mechanism for changing focal length of a group of lens of the optical system. The zooming mechanism comprises a straight guide (not shown in FIG. 2), cam grooves 2a, 2b which are provided in the lens mount 2 and slidably interlocked with a group of lens therein, a zoom motor 3 as a driving source of zooming operation, a rotating gear 3a which is fixed at the end of rotating shaft, a gear 3b which is interlocked with the gear 3a, a gear section 2c which is interlocked with the gear 3b and provided in the outer circumference of the lens mount 2 and the like. When the zoom motor 3 is driven, the revolving movement is transmitted to the lens mount 2 through the gears 3a, 3b and the gear section 2c so that the lens mount 2 is revolved on an optical axis. Accordingly, a group of lens slidably interlocked with the cam grooves 2a,2b changes the position of lens so that the focal length of the photographing optical system is changed.

Since the focusing mechanism is conventionally known, further description is omitted from this specification.

Figure 3:
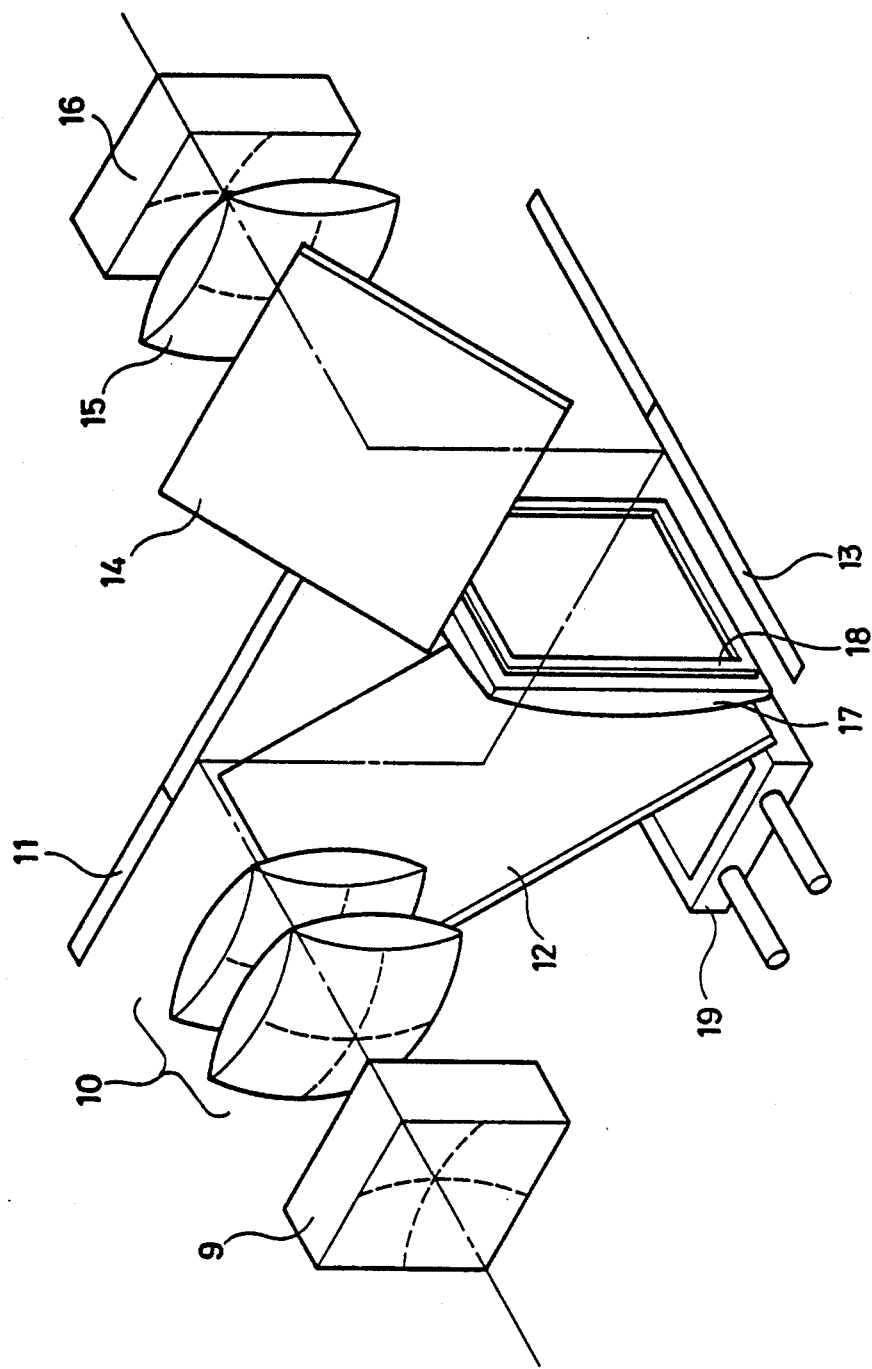
FIG. 3 is a perspective view showing the structure of a finder of the camera.

Now, the structure of the real image type finder system will be described with reference to FIG. 3.

The optical system of the real image type finder comprises objective lenses 9,10 for forming inverted real image of the object, polo-mirrors 11 to 14 for erecting the inverted real image, eyepieces 15,16 for expanding the erect image, a condenser lens 17 arranged near the focal plane of the objective lenses 9, 10, and a visual field frame 18. The lenses 9,10 are supported slidably by the straight guide plate (not shown in FIGS. 2 and 3) in parallel with the optical axis, and slidably interlocked with the cam grooves 4a,4b of a cam plate 4 (FIG. 2). The gear 3a is combined in a rack 4d of the cam plate 4.

Accordingly, when the zoom motor 3 is driven, the driving force is transmitted to the cam plate 4 through the gear 3a and the rack 4d so that the cam plate 4 moves perpendicular to the optical axis. With the movement of the cam plate 4, the lenses 9,10 slidably interlocked with the cam grooves 4a,4b change the relative positions between the lenses so that modification of finder magnification is carried out and the zooming operation of the finder is executed.

Figure 4:
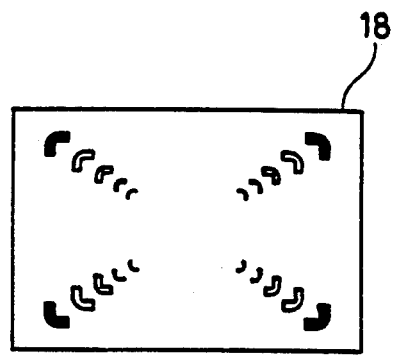
FIG. 4 is a pattern view of the visual field frame in a Liquid Crystal Display of the camera.

The visual field frame 18 displays the frame by using electro-optical element including LCD (Liquid Crystal Display) or ECD (Electrochemical Display) or the like. The outermost circumferential part of the visual field frame is opaque as shown in FIG. 4. Other pattern of the visual field frame is usually transparent. When pseudo focal length photographing is executed, the pattern of the visual field frame corresponding to the range to be printed becomes opaque, then the range to be printed will be recognized by a photographer.

At the lower part of the polo-mirror 12, there is provided a light metering element 19 of an exposure meter for measuring light which passes through the lenses 9,10.

Figure 5C:
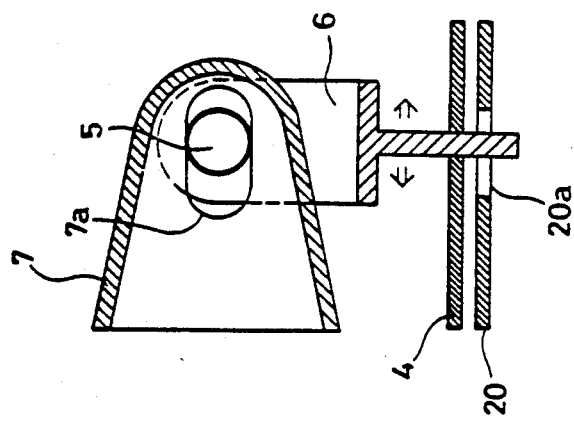
FIGS. 5(a), (b) and (c) are a sectional view, a front view, and a side sectional view showing the structure of a zoom electronic flash of the camera respectively.
Figure 5A:
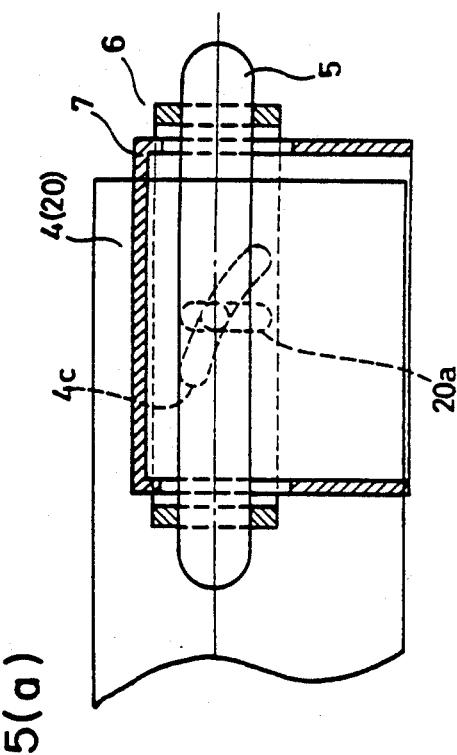
Figure 5B:
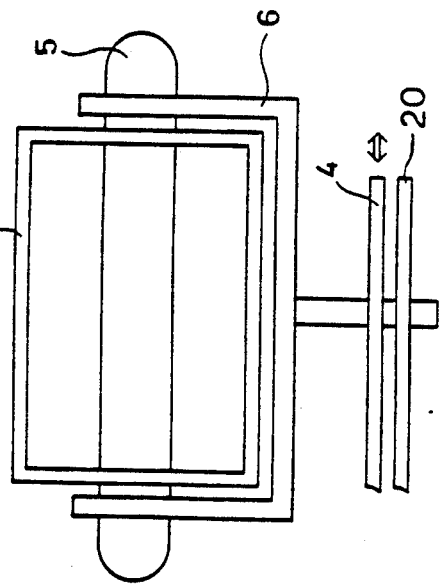

Now, the structure of the zoom electronic flash system will be described with reference to FIGS. 5(a), (b) and (c).

The zoom electronic flash system comprising a xenon tube 5 for flash light source, a holder 6 for supporting the xenon 5, and a reflector 7 fixed on a camera body, which illuminates flash light on an object. A cam groove 7a which is in parallel with the optical axis is provided on the reflector 7, the xenon tube 5 being slidably interlocked with the cam groove 7a. The projecting section of a holder 6 are slidably interlocked with a cam groove 4c provided on the cam plate 4, and a groove 20a which is in parallel with the optical axis of the straight guide 20 fixed on the camera respectively.

When the zoom motor 3 is driven, the cam plate 4 moves perpendicular to the optical axis according to the interlock of the gear 3a and the rack 4d. Then, the projecting section of the holder 6 which is slidably interlocked with the cam groove 4c moves in parallel with the optical axis so that the holder 6 and the xenon tube 5 moves in parallel with the optical axis. Therefore, the position of the xenon tube 5 to the reflector 7 and vice versa is changed and an illuminating angle of flash light is changed, then, the zooming operation of electronic flash is executed.

Now, a control device will be described with reference to FIGS. 6 and 7. The control device is contained in the camera and calculates the trimming magnification according to the measured object distance and controls the ratio of modification of finder magnification of the optical system lens by driving the above-mentioned motor 3. The control device consists of a microcomputer 30 in the embodiment of the present invention.

Figure 6:
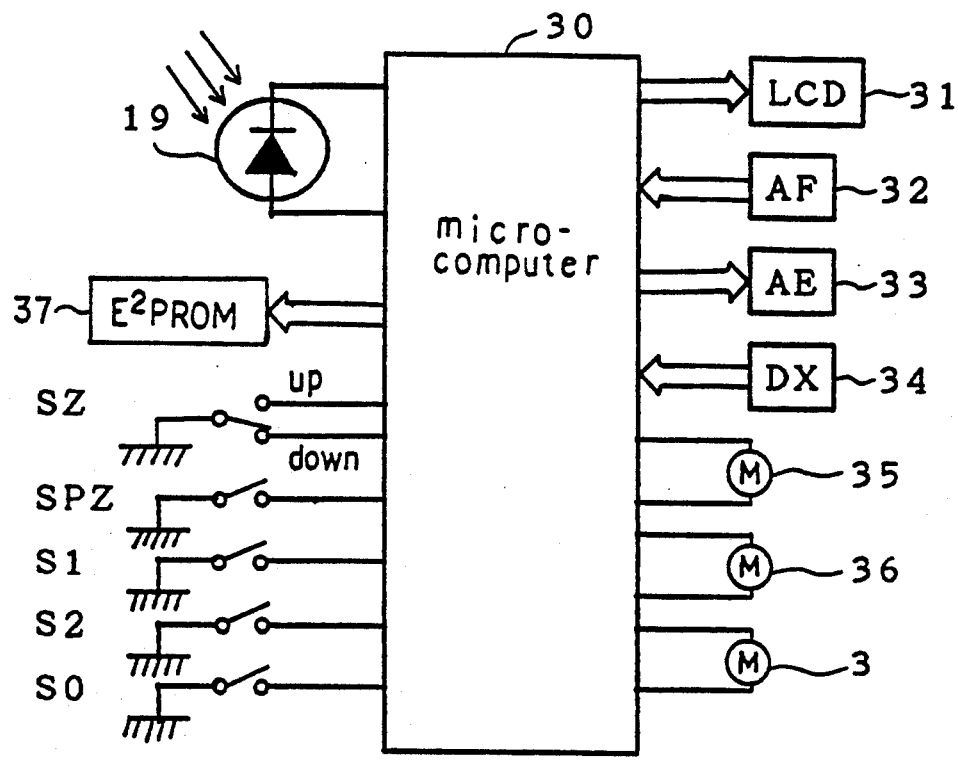
FIG. 6 is a circuit block diagram of a control device for controlling the whole camera system.

FIG. 6 is a block diagram showing the structure of an automatic trimming camera of the embodiment of the present invention. A microcomputer 30 controls the whole system of the camera. A main switch S0, a light metering/light measuring start switch S1, a release switch S2, a program zoom selecting switch SPZ, and a zoom switch SZ are connected to the microcomputer 30.

Figure 7:
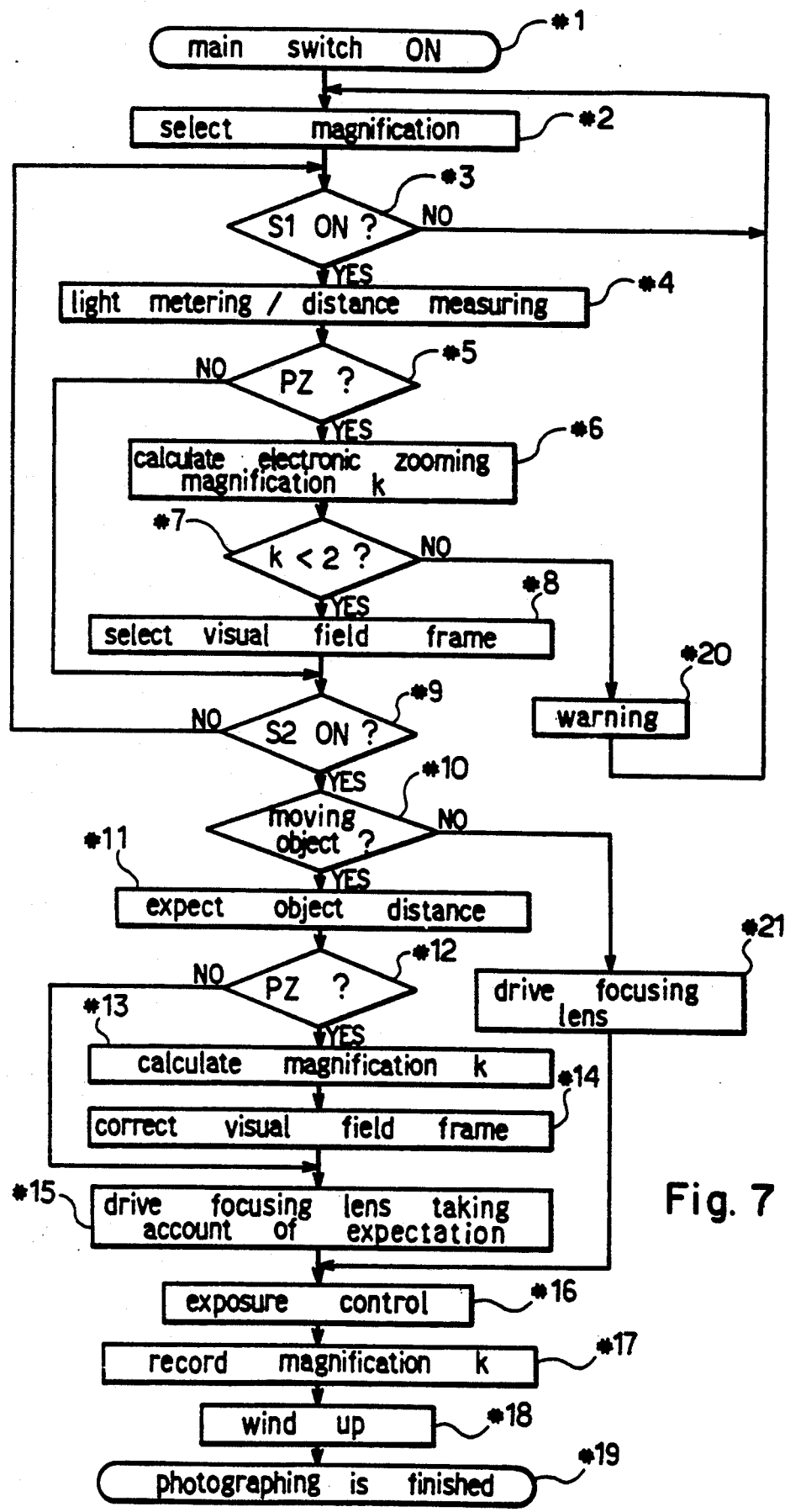
FIG. 7 is a flow chart showing pseudo focal length photographing operation by controlling of program zooming operation in the control device.

When the main switch S0 for starting up the camera system is turned ON, the microcomputer 30 starts to operate according to the flow chart shown in FIG. 7. The light metering/light measuring start switch S1 is turned ON with a first stage of the release bottom (not shown). When the switch S1 is turned ON, the microcomputer 30 receives the data metered by a light metering element 19 and executes an exposure operation. At the same time, the microcomputer 30 measures the object distance by operating a distance measuring means 32. The release switch S2 is turned ON with a second stage of the release bottom. When the switch S2 is turned ON, the microcomputer 30 controls an exposure means 33 based on the result of the exposure calculation, and executes an exposure control. The program zoom selecting switch SPZ is turned ON when a program zoom mode is selected. The zoom switch SZ for operating the above-mentioned zoom mechanism provides two connecting points up/down. The microcomputer 30 controls the zoom motor 3 so that the photographing lens is zoomed at the longer focal length side when the switch SZ is connected to the up side and the photographing lens is zoomed at the shorter focal length side when the switch SZ is connected to the down side.

Besides, a LCD 31 for displaying the visual field frame in the finder, a means 34 for reading out film speed data from a film cartridge, a motor 35 for winding up a film, and a motor 36 for executing focus operation by driving a focus lens are connected to the microcomputer 30. Further, an $E^2PROM$ 37 for recording the calculated trimming magnification indicating a pseudo focal length is contained in the film cartridge. With regard to the $E^2PROM$ 37 and data communication between the $E^2PROM$ 37 and the microcomputer 30, it is described in Japanese Patent Application No. 1-53389, for example.

The summary of the structure and operation of the control device of the camera are as follows.

When the light metering/distance measuring start switch S1 is turned ON, the object distance is measured for a plurality of times by the distance measuring means 32. Based on the measured data, it is judged whether the object is a moving object or not. When the object is a moving object, object distance after the release time lag (at the time when an exposure is executed practically) is predicted based on the data of the distance measuring. Then, based on the expected object distance, the trimming magnification in which the size of the object to the photographing range becomes predetermined size is calculated.

Now, an operation of the camera in the embodiment of the present invention will be described with reference to a flow chart of FIG. 7 showing an operating procedure.

When the main switch S0 is turned ON, the camera system is started up (step #1). Then zooming operation of each optical system or electronic flash system is executed by operating the zoom switch SZ, and the focal length of the photographing lens is set at desired value (step #2). Next, a first stage of the release bottom, that is, the time of switch S1 being turned ON, is awaited (step #3). When the switch S1 is OFF, the program returns to step #2.

When the switch S1 is turned ON, light metering and distance measuring of the object are executed (step #4), then the measured value is stored in a memory of the microcomputer 30. Next, whether the program zoom mode is selected or not, that is, whether the switch SPZ is turned ON or not is detected (step #5).

When the switch SPZ is ON, that is, when the program zoom mode is selected, an electronic zoom magnification k (trimming magnification) in which the size of the object to the photographing range becomes predetermined size is calculated in accordance with the distance data (step #6). Then, it is judged whether the value k is smaller than 2 or not (step #7). When the value is smaller than 2, the data for controlling LCD is outputted, and the visual field frame which shows the range to be printed corresponding to the magnification k is displayed in the finder (step #8). Then, it is judged whether a second stage of the release bottom, that is, whether the switch S2 is turned ON or not (step #9). When the switch S2 is OFF, the program returns to step #3.

When the switch S2 is turned ON, it is judged whether the object is a moving object or not, that is, it is judged whether the object is approaching retreating from the camera (step #10). When it is judged that the object is a moving object, the object distance after the release time lag is predicted based on the data of the distance measuring (step #11). Next, whether it is a program zoom mode or not is judged (step #12). When it is not a program zoom mode, that is, when the switch SPZ is OFF, the program advances to step #15. When it is a program zoom mode, that is, the switch SPZ is ON, trimming magnification k in which the size of the object to the photographing range becomes predetermined size is calculated based on the expected object distance at step #13. Then, the visual field frame is corrected in order to display the range to be printed corresponding to the magnification k obtained at step #13 (step #14). The motor 36 is driven based on the object distance predicted at step #11, then the focusing operation is executed (step #15).

When it is judged that the object is not a moving object at step #10, the program advances to step #21. The motor 36 is driven based on the data obtained by distance measuring at step #4, and the focusing operation is executed. Accordingly, a picture in-focus on a moving object can be obtained.

When distance measuring is executed for only one time when the switch S2 is turned ON, it cannot be judged whether the object is a moving object or not. At this time, it is judged that the object is not a moving object, then the program advances to step #21.

Thereafter, aperture amount of a shutter is calculated based on the light metering data obtained at step #4. The exposure means 33 is controlled and the film is exposed (step #16). Then, the electronic zoom magnification k is recorded in the $E^2PROM$ 37 contained in the film cartridge (step #17). When it is not a program zoom mode, in order to print whole range of a film frame, the electronic zoom magnification k is set to 1. Then, the film is wound up for one frame by driving the motor 35 (step #18), and the photographing is finished (step #19).

When the program zoom mode is not selected at abovementioned step #5, it is judged whether the first stage of the release bottom is pushed on or not, that is, the switch S2 is turned ON or not at step #9 without calculating the electronic zoom magnification k. The following operations are similar to those of operations before-mentioned.

When the value of the electronic zoom magnification k is double or more magnification at step #7, the warning is carried out (step #20). The program returns to step #2 and each optical system or electronic flash system is zoomed again. The focal length is reset, then the similar operations are repeated thereafter. When the magnification k becomes too large, the graininess of the film becomes worse so that a picture of low quality is obtained. To prevent this problem, the magnification k is limited within double magnification in the embodiment of the present invention.

Now, in the case when pseudo focal length photographing in which an approaching object fills the visual field frame is executed, the change of the visual field of the finder will be described with reference to FIG. 8. The change of the visual field of the finder by using the conventional automatic trimming camera will be described with reference to FIG. 9.

FIG. 8(a) shows the visual field of the finder when the object distance is measured by using the automatic trimming camera of the present invention. That is, the visual field of the finder during the operation of step #1 to #4. FIG. 9(a) shows the visual field of the finder when the object distance is measured by using the conventional automatic trimming camera.

When the visual field is changed to correspond with the whole body of the object in order to execute pseudo focal length photographing (step #6), the visual field of the finder becomes as shown in FIG. 8(b) and FIG. 9(b) respectively.

After that, when the second stage of the release bottom is pushed, that is, the switch S2 is turned ON in order to photograph the object at step #9, the visual field becomes as shown in FIG. 8(c) when the automatic trimming camera of the present invention is used. To the contrary, when the conventional automatic trimming camera is used, the visual field remains as shown in FIG. 9(b). At the time that the film is actually exposed by light after the shutter is driven (step #16), that is, after release time lag, the visual field of the finder becomes as shown in FIG. 8(d) and FIG. 9(c) respectively.

As above-mentioned, when pseudo focal length photographing in which an approaching object toward the camera fills the visual field is executed by using the conventional automatic trimming camera, because of the existence of release time lag, it is inconvenient since photographing in which the object is deviated from the designated printing image is executed as shown in FIG. 9(c). According to the automatic trimming camera in the embodiment of the present invention, even when the release time lag exists, the visual field frame can be corrected by predicting a movement of the moving object (step #14) and the visual field becomes as shown in FIG. 8(d). At the same time, the focal point of the object is predicted and the focus lens is driven to the focal point, then the film is exposed, such photographing that the object is deviated from the designated printing is not executed.

Like the embodiment of the present invention described above, when the program zooming operation is executed by designating the range to be printed of the film, it is not necessary to change the focal length of the photographing lens so that the program zooming operation can be executed in pursuit of a high-speed moving object.

Though the program zooming operation is executed by designating the range to be printed of a film in the above-mentioned embodiment, the present invention is applicable to any program zoom camera, and not being limited to the above-mentioned. For example, when the object is a moving object, program zooming operation may be executed by changing the focal length of the photographing lens based on the expected object distance. Further, program zooming operation may be executed by designating the range to be printed of a film in addition to changing the focal length of a photographing lens.

In the above-mentioned embodiment, the program zooming operation is executed in which the size of the object to the photographing range becomes predetermined size. The object size to the photographing range may be set optionally by a photographer.

As above-mentioned, according to the program zoom camera of the present invention, when the object is a moving object, object distance after the release time lag is predicted and the photographing range is changed based on the expected object distance so that the size of the object to the photographing range becomes constantly the predetermined size even when a moving object is photographed.

Photographing in which the object is deviated from the photographing scene can be prevented even when the object is a moving object approaching the camera.

Further, according to the present invention, since the program zooming operation is executed by designating the range to be printed of a film without driving the photographic lens, the program zooming operation can be executed in pursuit of a high-speed moving object.

What is claimed is:

1. A camera, comprising:
   means, having an operable switch, for exposing a film loaded in said camera in response to the operation of said operable switch, the operation of said exposing means being started after passing a predetermined release time lag from the operation of said operable switch;
   means for repeatedly detecting a distance to an object to be photographed;
   means for determining an electronic zoom magnification corresponding to a range to be reproduced;
   means for predicting the distance to the object after passing the predetermined release time lag on the basis of a plurality of said distances repeatedly detected; and
   means for determining, in accordance with the predicted distance, an electronic zoom magnification corresponding to a range to be reproduced.

2. A camera as claimed in claim 1, further comprising:
   means for indicating a range to be reproduced in a viewfinder provided in the camera; and
   means for controlling the indicated range in accordance with the determined electronic zoom magnification.

3. A camera as claimed in claim 2, further comprising an operable member, wherein the operation of said controlling means is started when said operable member is pushed to a first stage, and said operable switch is operated when said operable member is pushed to a second stage deeper than said first stage.

4. A camera as claimed in claim 2, wherein said controlling means includes means for generating a signal representative of said determined and indicated magnification.

5. A camera, comprising:
   means for detecting a distance to an object to be photographed;
   means for determining an electronic zoom magnification corresponding to a range to be reproduced in accordance with the detected distance; and
   means for repeatedly operating both of said detecting means and said determining means.

6. A camera as claimed in claim 5, further comprising means for indicating, in a viewfinder provided in the camera, an area to be reproduced in accordance with the determined electronic zoom magnification.

7. A camera, comprising:
   means for repeatedly detecting a distance to an object to be photographed;

means for predicting the distance to the object at a predetermined time on the basis of a plurality of said distances repeatedly detected; and means for determining, in accordance with the predicted distance, an electronic zoom magnification corresponding to a range to be reproduced, so that an object to be photographed may be reproduced at a predetermined magnification.

8. A camera as claimed in claim 7, further comprising:

means, having an operable switch, for exposing a film loaded in said camera in response to the operation of said operable switch, the operation of said exposing means being started after passing a predetermined release time lag from the operation of said operable switch; and means for operating said distance predicting means and said determining means within said release time lag.

9. A camera as claimed in claim 7, further comprising means for indicating, in a viewfinder provided in the camera, an area to be reproduced in accordance with the determined electronic zoom magnification.

10. A camera, comprising:

means for repeatedly detecting a distance to an object to be photographed;

means for setting an electronic zoom magnification corresponding to a range to be reproduced;

means for predicting the distance to the object at a start of exposure in the camera on the basis of a plurality of said distances repeatedly detected;

means for calculating a deviation between the set electronic zoom magnification and a predicted electronic zoom magnification corresponding to the predicted distance; and means for determining a resultant electronic zoom magnification in accordance with the deviation and the set electronic zoom magnification.

11. A camera comprising:

a zoom lens, provided in the camera, capable of varying its focal length;

means for setting the focal length of said zoom lens;

means for detecting a distance to an object to be photographed;

means for setting a magnification in accordance with the detected distance; and means for determining an electronic zoom magnification in accordance with the set focal length of the zoom lens and the set magnification.

12. A camera as claimed in claim 11, further comprising:

means for illuminating an object to be photographed; and means for controlling an illuminating angle of said illuminating means in accordance with the set focal length of the zoom lens.

13. A camera as claimed in claim 11, further comprising:

means for repeatedly detecting a distance to an object to be photographed;

means for predicting the distance to the object at a start of exposure in the camera on the basis of a plurality of said distances repeatedly detected; and means for determining a resultant electronic zoom magnification in accordance with the predicted distance and the set electronic zoom magnification.

14. A camera, comprising:

first means for setting a focal length of a photographing lens;

second means for setting an electronic zoom magnification;

a first manually operable member;

a second manually operable member;

first means for changing the focal length set by said first setting means in accordance with the operation of said first manually operable member;

second means for changing the electronic zoom magnification set by said second setting means in accordance with the operation of said second manually operable member;

means for detecting a distance to an object to be photographed; and means for changing the electronic zoom magnification in accordance with the detected distance.

* * * * *